US006092196A

United States Patent [19]

Reiche

[11] Patent Number: 6,092,196
[45] Date of Patent: Jul. 18, 2000

[54] HTTP DISTRIBUTED REMOTE USER AUTHENTICATION SYSTEM

[75] Inventor: Albert Reiche, Ottawa, Canada

[73] Assignee: Nortel Networks Limited, Montreal, Canada

[21] Appl. No.: 08/977,811

[22] Filed: Nov. 25, 1997

[51] Int. Cl.[7] .............................. H04L 9/32; G06F 13/14
[52] U.S. Cl. ........................ 713/200; 705/52; 709/229
[58] Field of Search .................................... 713/202, 201, 713/200, 155, 156, 159; 709/218, 225, 229, 227, 228; 705/52, 53, 64, 65

[56] References Cited

U.S. PATENT DOCUMENTS

| | | |
|---|---|---|
| 5,235,642 | 8/1993 | Wobber et al. . |
| 5,560,008 | 9/1996 | Johnson et al. ........................ 713/201 |
| 5,642,515 | 6/1997 | Jones et al. ............................. 710/220 |
| 5,684,950 | 11/1997 | Dare et al. ............................... 713/202 |
| 5,689,638 | 11/1997 | Sadovsky ................................. 713/202 |
| 5,706,427 | 1/1998 | Tabuki .................................... 713/202 |
| 5,708,780 | 1/1998 | Levergood et al. .................... 709/229 |
| 5,790,785 | 8/1998 | Klug et al. .............................. 713/202 |
| 5,818,936 | 10/1998 | Mashayekhi ............................ 713/202 |
| 5,841,970 | 11/1998 | Tabuki .................................... 713/202 |
| 5,864,676 | 1/1999 | Beer et al. .............................. 709/229 |
| 5,875,296 | 2/1999 | Shi et al. ................................. 713/202 |
| 5,908,469 | 6/1999 | Botz et al. ............................... 713/201 |
| 6,006,334 | 12/1999 | Nguyen et al. ......................... 713/202 |

FOREIGN PATENT DOCUMENTS

| | | |
|---|---|---|
| 0 762 261 | 3/1997 | European Pat. Off. . |
| WO 96/42041 | 12/1996 | WIPO . |
| WO 99/00958 | 1/1999 | WIPO . |
| WO 99/00960 | 1/1999 | WIPO ............................. H04L 29/06 |

OTHER PUBLICATIONS

Raptor Axcess, Internet Site http://www.raptor,com/axcess/.
Williams Stallings, Ph.D. Data and Computer Communicatins, Fourth Edition 1994, Chapter 15.1 Network Management: SNMPV2, pp. 715 to 724.
Williams Stalllings, Ph.D. Data and Computer Communications, Fourth Edition 1994, Chapter 14.3 pp. 672 to 686.
Operating Systems Second Edition 1995, Williams Stallings, Ph.D. User–Oriented Access Control Chapter 14.1, pp. 581 to 590.

Primary Examiner—Robert W. Beausoliel, Jr.
Assistant Examiner—Christopher Alan Revak

[57] ABSTRACT

The present invention relates to the field of data and computer network security. Data and computer network security is of the utmost importance to most organizations that possess such networks. One of the difficulties that users and managers of these networks face is that the users have to provide a user ID and password every time they wish to access one of the organization's secured HTTP servers or URLs. This creates a problem for users and managers since lists of numerous user IDs and passwords need to be maintained and therefore can easily be lost or their confidentiality compromised. This invention addresses these problems by providing a transparent, scalable, single point of authentication for remote users across any number of HTTP servers anywhere on a data network, such as an Intranet, using any user ID and password scheme implemented by a main authentication HTTP server.

30 Claims, 6 Drawing Sheets

HTTP DISTRIBUTED REMOTE USER AUTHENTICATION SYSTEM

FIELD OF THE INVENTION

The present invention relates to the field of data and computer network security. This large field can further be divided into three security-related layers: privacy, authentication, and access control. Privacy is the protection of transmitted data from eavesdropping or wiretapping. It requires that the contents of any message be disguised in such a way that only the intended recipient can recover the original message, file, document, or other collection of data is said to be authentic when it is genuine and came from its alleged source. Message authentication is a procedure that allows communicating parties to verify that received messages are authentic. The two important aspects are to verify that the contents of the message have not been altered and that the source is authentic. A message's timeliness (it has not been artificially delayed and replayed) and sequence relative to other messages flowing between two parties may also be verified. In the context of network management, the purpose of access control is to ensure that only authorised users have access to a particular management information base and that access to and modification of a particular portion of data are limited to authorised individuals and programs. This invention relates more specifically to a data network featuring an improved authentication and access control functions.

BACKGROUND OF THE INVENTION

A general introduction to data and computer network security is provided below. For more information on this topic, the reader is invited to consult the publications "Data and computer communications", $4^{th}$ edition, New York, N.Y.: Macmillan Publishing, 1994 and "Operating Systems", $2^{nd}$ edition, Englewood Cliffs, N.J.: Prentice Hall, 1995, both by William Stallings. The content of these publications is incorporated herein by reference.

The following paragraphs give definitions of terms used throughout this document.

HyperText Transfer Protocol (HTTP) (from RFC 2068): It is an application-level protocol for distributed, collaborative, hypermedia information systems. It is a generic, stateless, object-oriented protocol which can be used for many tasks, such as name servers and distributed object management systems, through extension of its request methods. A feature of HTTP is the typing and negotiation of data representation, allowing systems to be built independently of the data being transferred.

302 redirect (from RFC 2068): It is an HTTP status code. It signifies that the requested resource resides temporarily under a different Universal Resource Identifier (URI).

401 authenticate challenge (from RFC 2068): It is an HTTP status code. It signifies that the request requires user authentication. The response to the request must include a World Wide Web-Authentication header field containing a challenge applicable to the requested resource.

Hypertext Markup Language (HTML): It is a markup language for hypertext that is used with World Wide Web client browsers. Examples of uses of HTML are: publishing online documents with headings, text, tables, lists, photos, etc., retrieving online information via hypertext links, designing forms for conducting transactions with remote services (for use in searching for information, making reservations, ordering products, etc.), and including spreadsheets, video clips, sound clips, and other applications directly in documents.

Transmission Control Protocol (TCP): It is a library of routines that applications can use when they need reliable network communications with another computer. TCP is responsible for verifying the correct delivery of data from client to server. It adds support to detect errors or lost data and to trigger reconstruction until the data is correctly and completely received.

Internet Protocol (IP): A library of routines that TCP calls on, but which is also available to application that do not use TCP. IP is responsible for transporting packets of data from node to node. It forwards each packet based on a four-byte destination address (the IP number).

Socket: Name given to the package of subroutines that provide access to TCP/IP on most systems.

Cookie: It is a tool used to maintain state variables concerning the World Wide Web. A cookie can take the form of an HTTP header that consists of a string of information about the visit that is entered into the memory of the browser. This string may contain the domain, path, lifetime, and value of a variable, among other type of information.

Uuencode: It is a Unix operating system program for encoding binary data in the American Standard Code for information Interchange (ASCII) format.

Uniform Resource Locator (URL): It is a standard that was developed to specify the location of a resource available electronically. Examples of protocols that use URLs are HTTP, File Transfer Protocol (FTP), Gopher, Telnet sessions to remote hosts on the Internet, and Internet e-mail addresses. The Uniform Resource Locator describes the location and access method of a resource on the Internet, for example, the URL http://www.nortel.com describes the type of access method being used (http) and the server location which hosts the Web site (www. nortel.com)

Common Gateway Interface (CGI): It is a standard for interfacing external applications with information servers, such as HTTP or Web servers. A plain HTML document that the Web daemon (see definition below) retrieves is static, which means it exists in a constant state. An example of this is a text file. A CGI program, on the other hand, is executed in real-time, so that it can output dynamic information. An example of the use of such a gateway is when a database is hooked up to the World Wide Web. In this case, a CGI program, which the web daemon will execute to transmit information to the database engine, receive results back and display them to the client, needs to be created.

Daemon: It is a program that is not invoked explicitly, but lies dormant, waiting for some condition to occur. It is a process that has detached itself from a parent process and that may either live indefinitely or be regenerated at intervals. Typically, the program waits in the background and runs when a request is made on the port that it is watching. It normally works out of sight of the user. On the Internet, it is most likely encountered when e-mail is not delivered to the recipient. The message originator receives then the original message plus a message from a "mailer daemon."

For secure communications, it is essential to identify specifically a source and a destination for any exchange. Authentication depends on the source: it is the responsibility of the source to include information in any message that assures that the origin is authentic, and it is the responsibility of the destination to perform the required functions to insure message integrity. However, message privacy, which is achieved by encryption, depends on destination. That is, encryption must be done in such a way that only the intended destination can perform the decryption. Finally, access control depends on both source and destination. That is, each destination may have a distinct access policy for each potential source.

The measures taken to control access in a data processing system fall into two categories: those associated with the user and those associated with the data.

The control of access by user is sometimes referred to as authentication. The most common technique for user access control on a server is the user log on procedure, which requires both a user identifier (ID) and a password. The system will allow a user to log on only if that user's ID is known to the system and if the user has entered the correct password associated by the system with that ID. This ID/password combination is a notoriously unreliable method of user access control. Users can forget their passwords, and they can accidentally or intentionally reveal their password. Hackers have become very skillful at guessing IDs for special users, such as system control and systems management personnel. Finally, the ID/password files are subject to unauthorised access or tampering.

The problem of user access control is compounded over a communication network. The log on dialogue must take place over the communication medium, and eavesdropping is a potential threat.

User access control in a distributed environment can be either centralised or decentralised. In a centralised approach, the network provides a log on service to determine who is allowed to use the network and to whom the user is allowed to connect.

Decentralised user access control treats the network as a collection of transparent communication links, and the usual log on procedure is carried out by the destination host. In this situation, the security concerns for transmitting passwords over the network are real.

In many networks, two levels of access control may be used. Individual hosts may be provided with a log on facility to protect host-specific resources and applications. In addition, the network as a whole may provide protection to restrict network access to authorised users. This two-level facility is desirable for the common case in which the network connects disparate hosts and simply provides a convenient means of terminal/host access. In a more uniform network of hosts, a centralised access policy can be enforced.

The following is a brief description of the data-oriented access control procedures, as they are presently known in the art.

Following a successful log on procedure in a data network, the user is normally granted access to one or to a set of hosts and applications. This is generally not sufficient for a system that includes sensitive data in its database. Through the procedure for user access control, the user can be identified to the system. Associated with each user, there can be a user profile that specifies permissible operations and file accesses. The operating system can then enforce rules based on the user profile. The database management system, however, must control access to specific records or even portions of records. For example, it may be permissible for anyone in administration to obtain a list of company personnel, but only selected individuals may have access to salary information. The issue is more than just one of level of detail. Whereas the operating system may grant a user permission to access a file or use an application, after which there are no further security checks, the database management system must make a decision on each individual access attempt. That decision will depend not only on the user's identity but also on the specific parts of the data being accessed and even on the information already divulged to the user.

Thus, there exist in the industry a need to provide an improved user authentication system particularly for use on a data network, permitting to establish a strict, yet user-friendly function to control access to network resources or data.

OBJECTIVES AND SUMMARY OF THE INVENTION

An object of the present invention is to provide a novel authentication server for use in a data network Another object of this invention is to provide an improved customer server for supporting resources that can be released to a user through data exchange in a data network.

Another object of the invention is to provide a data network implementing an improved user access control protocol.

Yet, another object of the invention is to provide a novel data network with an improved access control system.

Yet, another method is to provide a novel access control method for a data network.

As embodied and broadly described herein the invention provides an authentication server for use in a data network that includes a plurality of nodes connected to one another by data transmission pathways, comprising:

- a database for holding user identification data on a plurality of users that may potentially seek access to a resource at a first node accessible through the data network;
- access challenge means for issuing a message in the data network for prompting a user residing at a second node of the data network to enter at the second node a user identification data element;
- verification means operable in response to the user identification data element entered by the user at the second node and susceptible to grant an access right in dependence of a contents of the user identification data element;
- means for issuing in the data network a communication containing data suitable for retention by the second node to form an access grant mark, the access grant mark being subsequently recognizable by the first node as indication of past occurrence of access grant by said verification means.

In a most preferred embodiment of this invention, the data network that can be defined as a collection of nodes connected to one another by data transmission pathways implements a secure access control protocol featuring a central authentication server. When a user is desirous to access a resource on a given customer server, say through HTTP data exchange session, the browser on the user's machine makes a first contact with the customer server. Access to the resource that is being sought is not permitted by the customer server since an access grant control transaction has not yet been completed, in other words, the customer server does not know if the request made by the user is legitimate. The customer server then causes initiation of the access grant control transaction. The first step is to generate a transaction ID that uniquely identifies the session with the user. That transaction ID is stored in a special URL along with the client IP address, expiry time, check sum etc., its fundamental purpose being to create a unique identifier for the session. The transaction ID is stored in a database in the customer server and it is also encoded and sent to the user along with a redirect request to the central authentication server. Most preferably, the transmission of the transaction ID to the client is protected by any suitable encryption method, such as by private key encryption. A suitable vehicle to transmit the transaction ID is to append it to the URL string providing the address of the authentication server, as a parameter. That parameter, which in the usual URL nomenclature may designate a certain file, is used here to transport the transaction ID information.

The redirect command is received by the user's browser that then makes contact with the central authentication server, carrying the transaction ID in one of the parameter fields of the URL string. The authentication server receives the request and determines that this user has not yet properly logged on the network. The central authentication server then initiates the access grant control procedure in the form of an authentication challenge. In other words, the authentication server issues control data to the user's machine to invoke on the display screen a dialog box with user ID and password fields that must be completed by the user. In addition to these two user identification data elements, other information may also be requested from the user, without departing from the spirit of the invention. At this point, the user's browser will retain in memory the authentication data that is supplied to the authentication server, namely the user ID, password or any other authentication information. This function does not need to be described in detail since it is already provided by commercially available browsers such as those available from Netscape, USA.

When the authentication server receives the response to the authentication challenge the data is compared against entries in a database holding user Ids and passwords of authorized users. If a match is found, indicating that the user is legitimate, the authentication server extracts from the URL string the transaction ID information originally generated by the customer server holding the resource that the user seeks and that is carried with the messages the user's machine sends to the authentication server. The transaction ID is then stored in the authentication server for future reference.

At this point the authentication server issues a redirect request to the user's browser passing the transaction ID as parameter in the URL string. Note that the transaction ID data that is passed here may not necessarily be identical to the transaction ID received earlier by the authentication server as additional data may be added to it. It should contain, however enough information common with the transaction ID received by the authentication server to enable the customer server holding the resource sought by the client to check it against the transaction ID data held in the customer server's memory.

The redirect request points toward the customer server that holds the resource sought by the user. When the user's browser reconnects to the customer server, the customer server will extract the transaction ID and compare it with the transaction ID held in memory. If a match is found, the customer server then determines that the session is the same than the one corresponding to the transaction ID stored in the customer server's memory. At this stage the customer server can only establish that session continuity has been maintained. It has no information yet about the legitimacy of the user. To resolve this question, the customer server establishes a communication with the central authentication server, passing the transaction ID data. Note that in this case the communication is not passed through the user's machine, and it is made directly from the customer server to the authentication server using solely a TCP/IP protocol.

The central authentication server receives the transaction ID and determines by comparing it to the transaction ID stored in memory that a match exists. A status code is then sent to the customer server to indicate that the user has been validated. Along with the status code is passed the user ID and authentication server user information. The customer server then constructs a new transaction ID that is locally stored and it is also embedded in a cookie. That cookie is then passed along with a redirect request to the user's machine, the redirect pointing to the URL originally requested by the user. That cookie provides a mark on the user's browser indicating that the user is authentic. It should be noted, however, that this mark is customer server specific. In other words, it will authorize the user's browser to connect only to the customer server that issued the cookie. If the user attempts to connect to another customer server on the network, a new authentication procedure will be initiated.

In accordance with the redirect procedure, the user's browser reconnects to the customer server. The presence of the cookie is noted and the cookie data checked against the transaction ID held in memory. If a match is found then the customer server assumes that the user is valid.

The next step of the verification procedure is to determine if the user, now verified as being valid, is authorized to access the resource he is seeking This is effected by retrieving the user ID from the memory table on the customer server and passing it to the authentication server along with the original URL requested by the user. That server holds a database of user ID codes associated with access privileges. If in this particular instance the user can have access to the requested URL the authentication server issues a status code to the customer server permitting release of the resource, that would typically be a file holding information.

One advantage that results from the access control procedure described above is that once the user has been validated and the cookie holding the user ID and the authentication server user information placed in the user's browser, the interaction user/authentication server, where the user is required to input a user ID and a password is no longer necessary in instances where the user connects with a different customer server. During the connection with the different customer server the exact same access control procedure described above will take place, however it will be transparent to the user since the step that consists of entering the user ID and password will be eliminated since this data is cached on the user's browser. More specifically, when a user attempts to connect to a different customer server on the network, that customer server will redirect the user's browser to the authentication server, as per the procedure described earlier. When the user's browser accesses the authentication server, it will automatically release the authentication information (user ID, password and any other authentication information). This function is inherent to commercially available browsers, such as those from Netscape, USA. This function is triggered when the browser connects with an URL to which it has connected in the past. Thus, when the browser recognizes the URL of the authentication server it will release the authentication information, that in turn will be accepted as by the authentication server for processing and verification in its tables. Therefore, this procedure avoids the necessity for the user of supplying the authentication information a second time. The redirect procedure is an important component of this method since it establishes a central site to which requests made by user browsers are redirected to take advantage of the inherent storage and release function of authentication information build in commercially available browser software.

As embodied and broadly described herein the invention also provides a data network, comprising:
- a plurality of nodes connected to one another by data transmission pathways;
- an authentication server residing at one of said nodes;
- a customer server residing at another one of said nodes, said customer server supporting a certain resource;
- said customer server being responsive to a first message from a user at a certain node of said network requesting access to the certain resource to issue a response message to the certain node, said response message causing the certain node to initiate an access grant control transaction with said authentication server, said access grant control transaction characterised by requesting the user to provide a user identification data element.

As embodied and broadly described herein the invention also provides a customer server for use in a network including an authentication server, said customer server providing means for supporting a certain resource potentially sought by a user from a certain node of a network, said customer server being responsive to a message issued from the certain node requesting release of the certain resource to generate a control message to the certain node prompting the certain node to initiate an access grant control transaction with the authentication server.

A customer server for use in a network including an authentication server, said customer server providing means for supporting a certain resource potentially sought by a user from a certain node of a network, said customer server being responsive at least in part to a first message issued from the authentication server to issue a second message to the certain node, said second message including data suitable for retention by the certain node to form an access grant mark, the access grant mark being recognizable by the customer server as indication of occurrence of an access grant control transaction between the authentication server and the certain node.

As embodied and broadly described herein, the invention also provides a method for access control in a data network including:
- a plurality of nodes connected to one another by data transmission pathways;
- an authentication server residing at one of said nodes;
- a customer server residing at another one of said nodes, said customer server supporting a certain resource, said method comprising the steps of:
- receiving at said customer server a request for access by a user residing at a certain node of the data network to the certain resource;
- issuing a control message toward the certain node to cause initiation of an access grant control transaction with said authentication server, said access grant control transaction characterised by requesting the user to provide a user identification data element.

BRIEF DESCRIPTION OF THE DRAWINGS

FIG. 1 is a block diagram showing a general overview of a client/server network constructed in accordance with the present invention;

FIGS. 2a–2e illustrate is a flowchart illustrating the steps of a method for authenticating a user for the purpose of releasing a certain resource, in accordance with the invention.

DESCRIPTION OF A PREFERRED EMBODIMENT

Figure 1:
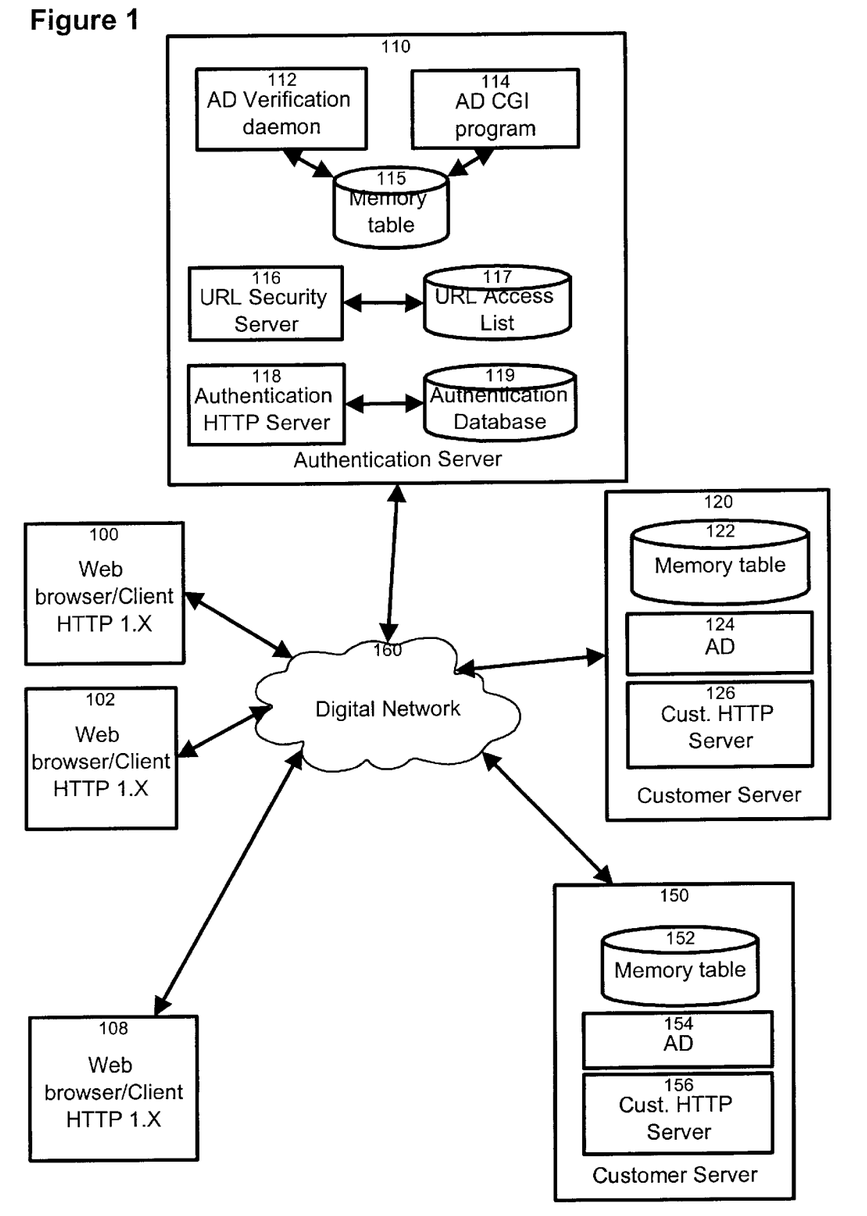
Figure 2A:
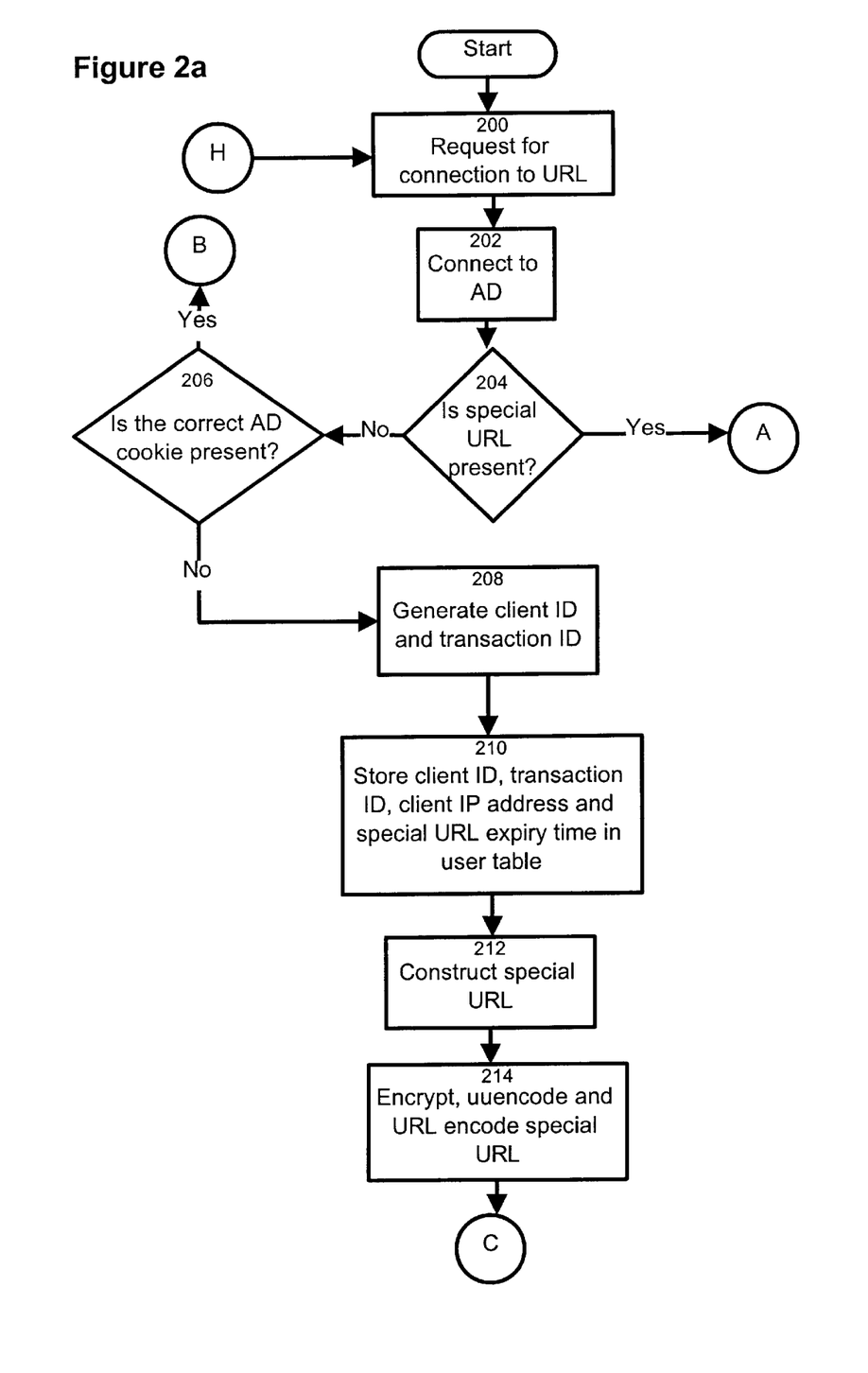
Figure 2B:
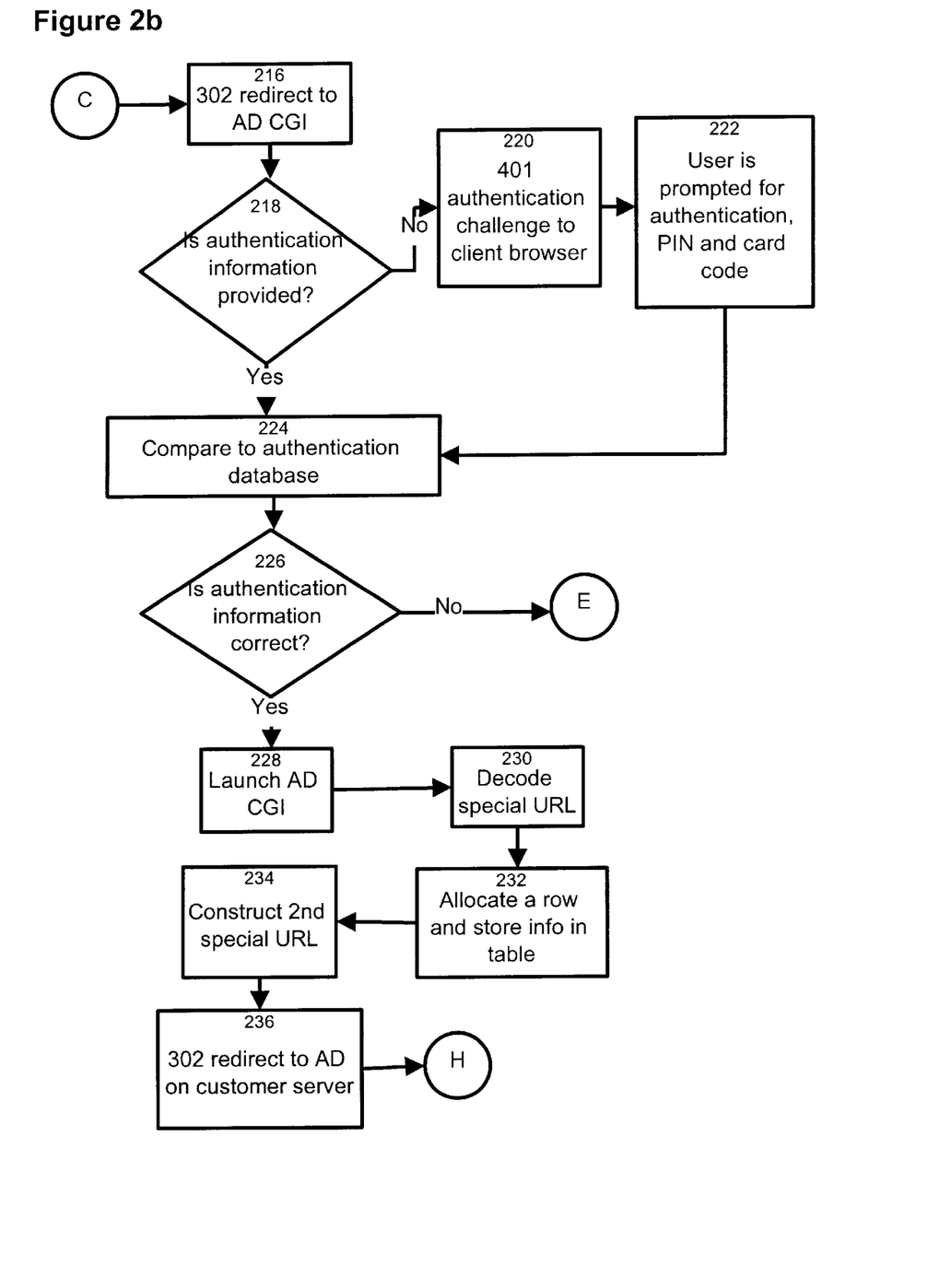
Figure 2C:
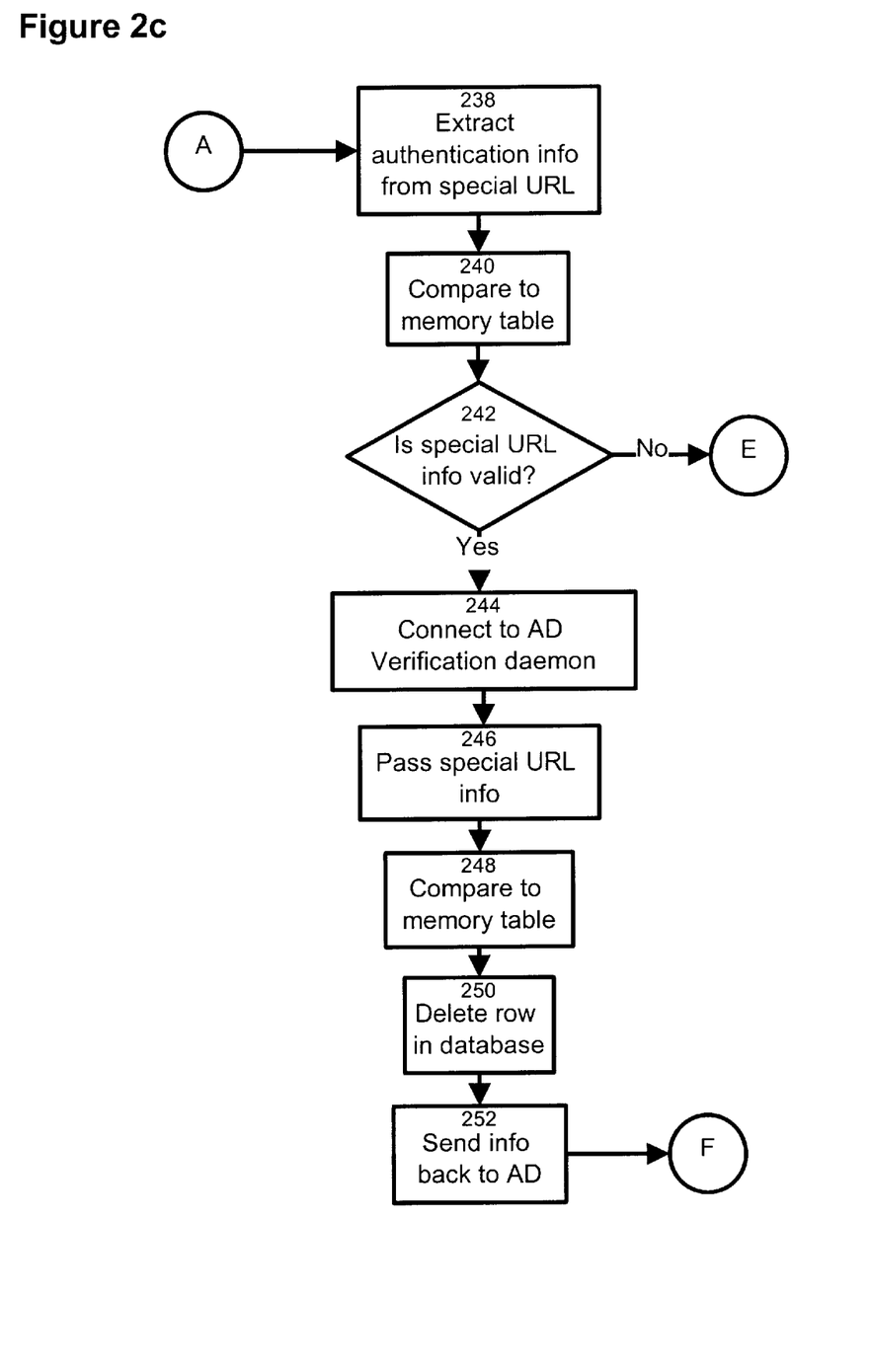
Figure 2D:
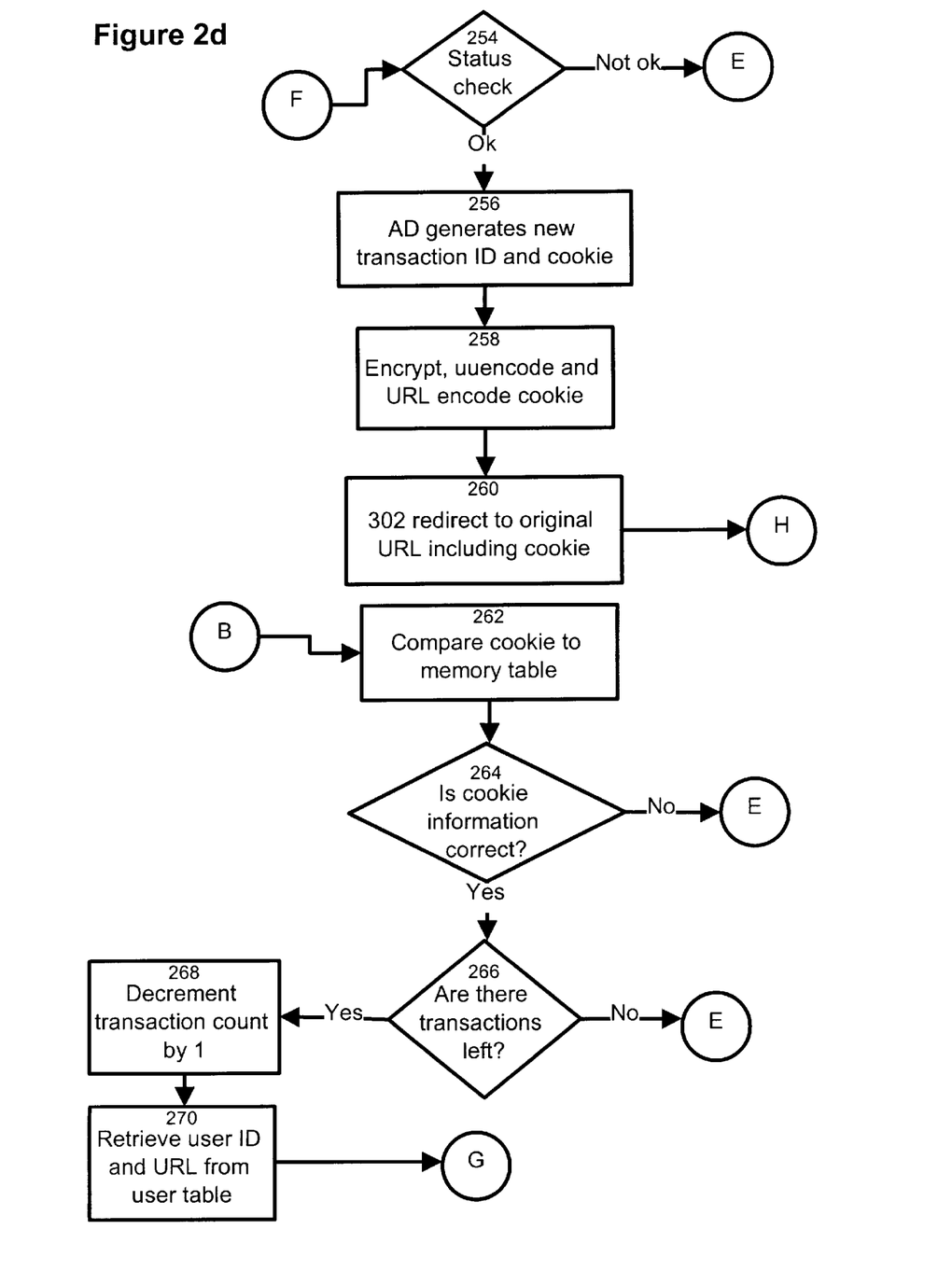
Figure 2E:
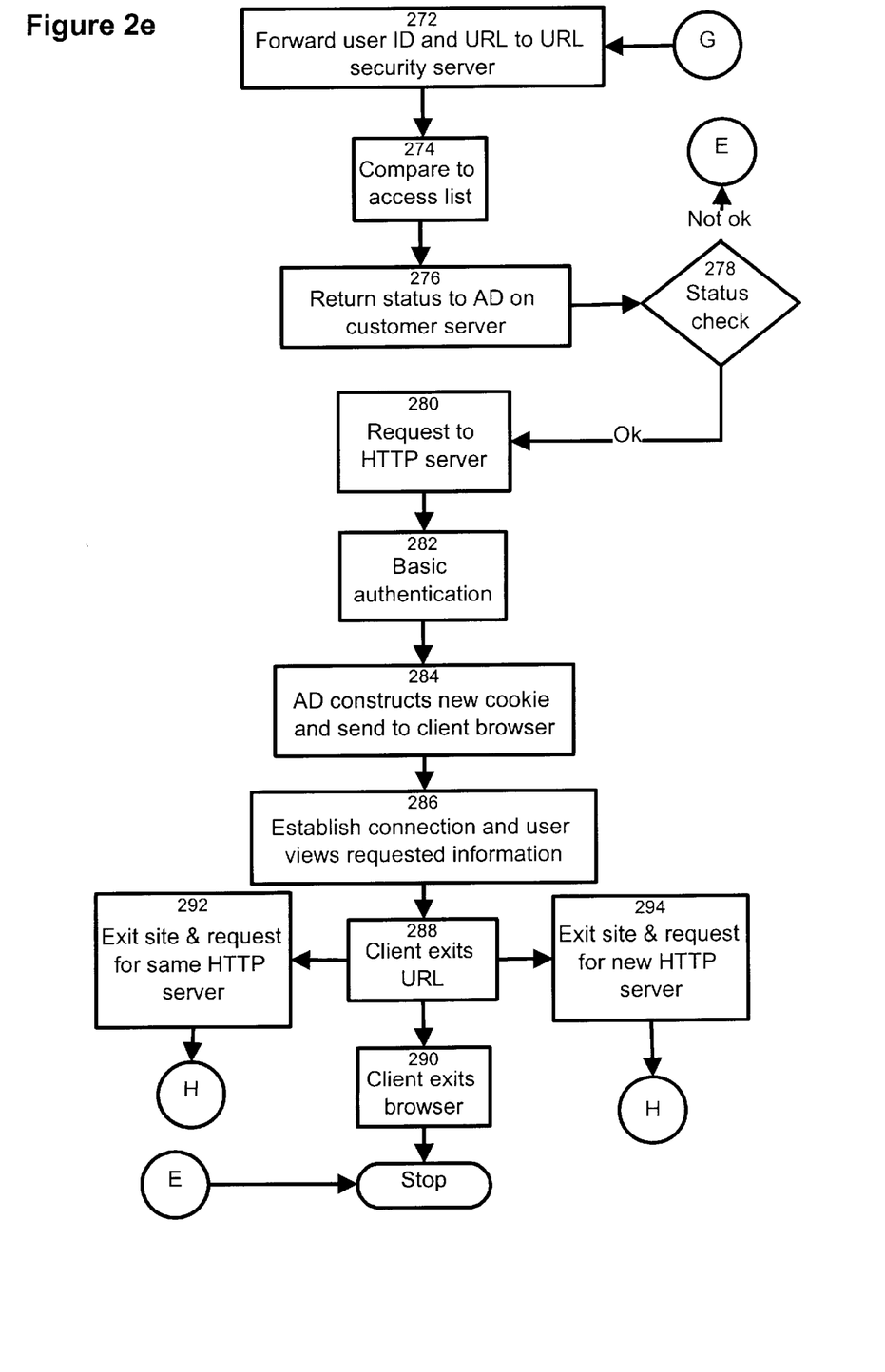

An overall view of a client/server data and computer communications network is shown in FIG. 1. Web browser/clients 100 to 108, residing on individual computers using HTTP 1.X, are connected to the digital network 160. Also connected to the digital network 160, is an authentication server 110. Most preferably, a single authentication server 110 is provided for the entire network, rather than two or more of those servers. The advantage of this arrangement is that passwords and user ID data need to be stored and maintained in a single location in the network. Evidently, the invention is not limited to this particular feature. The authentication server 110 includes an Authentication Daemon (AD) verification daemon 112, a AD CGI program 114, a table 115 held in the memory of the server, a URL security server 116, a URL access list 117, an authentication HTTP server 118 and an authentication database 119. The authentication database 119 is a simple table which may hold usernames, personal identification numbers and passwords. The storage and update of this information is an administrative function. Finally, a number of customer servers 120 to 150 are connected to the digital network 160. Each customer server, such as 120, includes a memory table 122, a AD 124 and a customer HTTP server 126. The interactions between each of the components of the network are detailed below. A point to note is that all communications between the client browser 100 and the authentication server 110, or a customer HTTP server 120 to 150, are performed using HTTP 1.X On the other hand, communications between servers are made directly over the TCP/IP format with no higher protocol required.

Note that a complete description of the various data structures for the memory tables, the special URLs and cookie can be found at the end of this section. Also note that the AD verification daemon 112, the AD CGI program 114, the URL security server 116 and the authentication HTTP server 118 functional blocks are programs and are executed by the CPU of the authentication server 110. Furthermore, the AD 124 is a program that is executed by the CPU of the customer server 120.

FIGS. 2a–2e show a detailed flowchart of the events taking place when a user desires to access a resource, such a certain file that is located on a customer server of the digital network.

Firstly, a client 100 makes a request (step 200) for a connection to a secure customer HTTP server such as 126 by specifying an URL. The URL contains the address of the Authentication Daemon 124 located on the customer server 120, and therefore connects to the AD (step 202) to establish the connection through the digital network 160. The purpose of the Authentication Daemon 124 involvement is to determine if the request made by the client can be authorized. More specifically, the Authentication Daemon 124 will inspect the HTTP header of the data sent by the browser of the client for a special URL (step 204) This information, to be generated and embedded later in the header, is not available at this point. The AD will also look for a specific cookie (step 206) in the HTTP header and, at this point, will not find it either. The Authentication Daemon 124 then concludes that the request made by the client has not been authenticated and it will initiate an authentication procedure involving the authentication server 110. At step 208 the Authentication Daemon 124 will generate a unique 4 byte client ID and a 16 byte random transaction ID and store them (step 210) in a row of the memory table 122 along with the client's IP address and the special URL expiry time. At step 212, a special URL is constructed from the row ID, client ID, transaction ID and a checksum of these three values. This information is then encrypted using a simple private key encryption algorithm, uuencoded and URL encoded to facilitate transmission (step 214). At step 216, the AD issues, to the client browser 100, a 302 redirect to the AD CGI program 114 on the authentication server 110, passing the special URL as a parameter. More specifically, the redirect command includes an URL string that points to the AD CGI 114, a parameter of the string conveying the transaction ID constructed earlier.

A point to note is that all these steps are transparent to the user. Instances when the user is prompted will be annotated accordingly.

The authentication server 110 receives the request for the automatic redirect and an attempt to run the AD CGI program 114 is made. The authentication server 110 will determine whether this browser has ever attempted to log on to it before. This is done through the use of an HTTP header from the client's browser 100 (step 218). The authentication server 110 looks for the proper authentication information present in the HTTP header, does not find it, and, therefore, sends a 401 authentication challenge back to the client's browser (step 220). At this point (step 222), the browser 100 will prompt the user for the authentication login information.

The client now sees a dialog window on the screen that requests him to login. He enters his authentication login information, such as his user ID, password and any other authentication data. As discussed earlier, the browser will store this data internally so it can be released again when the browser reconnects to the authentication server. This function will be described later. For the time being suffice it to say that the function is useful when an authentication procedure must be completed when the user wishes to access a different resource located on another customer server in the network.

The browser reconnects to the authentication HTTP server 118 supplying the authentication information. Contrary to the previous request (step 218), the client browser now sends the proper HTTP header to the authentication HTTP server 118, compares, at step 224, the authentication information to the authentication database 119 and if the information is correct, launches an instance of the AD CGI program (step 228) and executes it. The AD CGI decodes the passed special URL (step 230), allocates a row in the memory table 115 and stores the row ID, the client ID, transaction ID, user ID and time out value in the row (step 232). At step 234, another special URL containing the AD authentication table row ID, client ID, transaction ID and checksum of these three values is constructed. The AD CGI program 114 then issues (step 236), to the client browser, a 302 redirect to the AD 124 on the customer server 120 passing, in the HTTP header, the special URL as a parameter. The special URL points, in fact, to the AD 124, passing as a parameter of the transaction ID data.

The scheme then returns to step 200, where the client's browser 100 makes a request, through the AD 124, for a connection to the secure customer HTTP server 126. The AD 124 on the customer HTTP server 120 will detect the special URL containing the transaction ID. The row ID, client ID, transaction ID and authentication row ID are extracted from the special URL (step 238). At step 240, the client ID, transaction ID, time out value and client IP address are verified against those stored in the memory table 122. If the verification is successful (step 242), the scheme will proceed to step 244.

In the next few steps, the AD 124 will verify that the client 100 did in fact logon to the authentication server 110 thereby eliminating intruders. At step 244, the AD 124 on the customer server 120 establishes a direct connection to the AD verification daemon 112 on the authentication server 110 passing along the client ID, transaction ID and authentication row ID (step 246). This connection is made by using the TCP/IP protocol, without involving HTTP. The AD verification daemon 112 authenticates the client ID and transaction ID by comparing them, at step 248, to the values in the memory table 115. At step 250, it deletes the row and, at step 252, passes back, to the AD 124, a status code, the user ID, the authentication server user information, the maximum number of accesses allowed and the cookie expiry time limit. If the authentication has been successful the status code will typically indicate this by using any suitable nomenclature. The AD 124 on the customer server 120 then checks the status code (step 254), at step 256, generates a new 16 byte transaction ID and constructs a cookie out of memory table 122 row ID, client ID and the new transaction ID. This information is then encrypted (step 258) using the same method as for the first special URL, that is, using a simple private key encryption algorithm, UUencoding and URL encoding the data. At step 260, the AD 124 on the customer server 120 issues, to the client browser 100, a 302 redirect to the original URL requested in step 200 and, this time, includes the cookie in the HTTP response header. That cookie, in accordance with well-known HTTP communication protocols, will provide a session-persistent mark on the client browser that allows the server onto which he was just logged on to verify that this user has performed the procedure described above. It is important to note that the cookie allows the customer server to determine that the user has been authenticated. That cookie, however, is only valid for that particular customer server. If the user wishes to access a resource located on another customer server, a new cookie must be constructed for the new customer server, by following the procedure described above.

In accordance with the 302-redirect procedure, the client browser 100 reconnects to the AD 124 on the customer server 120 (step 200), requesting the original URL (customer HTTP server 126). This time, the AD 124 detects the presence of the AD cookie embedded earlier and extracts the correct AD cookie from others that may be present. The row ID, client ID and transaction ID are determined from the cookie and, at step 262 and 264, are verified against the memory table 122. In addition, the number of transactions completed is checked (step 266) and the number of transactions left is decremented by one (step 268).

One last verification now needs to be performed, which is to ensure that the user has access to the URL requested (customer HTTP server 126). In order to do this, the user ID is retrieved (step 270) from the memory table 122. At step 272, the user ID and URL requested are forwarded to the URL security server 116 on the authentication server 110, which verifies (step 274) that the user has access to this URL (customer HTTP server 126) and that the URL is enabled, by comparing the information to the URL access list 117. This communication is effected from server to server by using solely the TCP/IP protocol. At step 276, the URL security server 116 returns a status indicating whether the verification procedure was successful or not (true or false status) to the AD 124 on the customer server 120. At step 278, the AD 124 checks the status then, at step 280, forwards the request to the customer HTTP server 126 requested (i.e. the original URL requested) including the user ID, user information and basic authentication information in the HTTP request headers. At step 282, the customer HTTP server 126 performs basic authentication as it normally would (i.e. without this invention embodied) and then responds to the AD 124, which generates a new cookie (as described in step 256) and forwards it along with the customer HTTP server 126 response back to the client browser 100 where it will be cached in memory (step 284). Note that basic authentication is part of the established HTTP and is well known to those skilled in the art and therefore will not be described in detail here. The connection is now established (step 286) and the user has access to the requested information.

Once the user has finished viewing the information, he will do one of three things; 1—exit the browser; 2—exit this site and request the same site later on; or 3—exit this site and request a different site.

If the user exits the browser (step 290), the scheme will be initiated from the start box the next time he needs access to a secure HTTP server.

If the user further accesses the same customer HTTP server 126 (step 292) before exiting his browser, the procedure will go to step 200, but when he reaches step 206 ("Correct AD cookie present?"), he will jump directly to step 262 to compare the cookie to the memory table 122 and carry on from there.

If the user exits this site and requests access to a new customer server, say 150 (step 294), the whole procedure must be completed again with the exception that when step 218 is reached (verification of authentication information) it will go directly to step 224 since the client has already provided his user ID and password in his initial request and this information is cached on his browser. More specifically, the new customer server will examine the information supplied by the user's browser and it will determine that the proper cookie required to access the resource held on the new customer server is not present. The new customer server will then issue a redirect command causing the user's browser to connect with the authentication server. During the reconnect procedure, the user's browser will recognize the URL of the authentication server and will release the authentication information that it holds, namely the user ID and password. That authentication information is processed by the authentication server and the new cookie suitable to allow the user's browser to access the new customer server is generated.

The information provided below is a complete description of the various data structures for the memory tables, the special URLs and cookie.

Data structure of memory table 122 on customer server 120:
16 byte transaction ID
128 byte character string for user specific data
4 byte signed client ID
4 byte unsigned access count
4 byte signed expiry time
4 byte signed last accessed time
4 byte unsigned peer address
6 byte random number generator seed
9 byte character string user ID
Data structure of memory table 115 on authentication server 110:
16 byte transaction ID
128 byte character string for user specific data
4 byte signed client ID
4 byte unsigned access count
4 byte signed expiry time
9 byte character string user ID
Data structure of special URL produced by AD 124 on customer server 120:

special URL version string
4 byte unsigned row ID stored as a string
4 byte signed client ID stored as a string
16 byte transaction ID stored as a string
Host name or IP address of customer server her stored as a string
Original requested URL string
4 byte unsigned CRC stored as a string
Data structure of special URL produced by AD CGI 114 on authentication server 110:
special URL version string
4 byte unsigned row ID stored as a string
4 byte signed client ID stored as a string
16 byte transaction ID stored as a string
Original requested URL string
4 byte unsigned row ID of table row on the authentication server
4 byte unsigned CRC stored as a string
Data structure of cookie produced by AD 124 on customer server 120:
Cookie version string
4 byte unsigned row ID stored as a string
4 byte signed client ID stored as a string
16 byte transaction ID stored as a string
4 byte unsigned CRC stored as a string

What is claimed is:

1. An authentication server for use in a data network that includes a plurality of nodes connected to one another by data transmission pathways, comprising:
    a database for holding user identification data on a plurality of users that may potentially seek access to a resource at a first node accessible through the data network;
    said authentication server being operable for issuing a message in the data network for prompting a user residing at a second node of the data network to enter at the second node a user identification data element;
    said authentication server being operable to process the user identification data element entered by the user at the second node to determine if an access right should be granted to the user;
    said authentication server being operable to direct to the first node a communication containing data permitting the first node to generate and transmit to the second node an access grant mark, the access grant mark being retained by the second node and subsequently recognizable by the first node as indication of past occurrence of access grant by said authentication server.

2. An authentication server as defined in claim 1, wherein said authentication server includes a database holding a list of individual user identification data elements, each of said user identification data elements characterizing a user that may potentially seek an access right.

3. An authentication server as defined in claim 2, wherein said authentication server is also operable in response to a query from the first node to grant a resource access right to a particular user in dependence of the user identification data elements in said database characterizing the particular user.

4. An authentication server as defined in claim 3, wherein each individual user identification data element includes a user ID portion.

5. An authentication server as defined in claim 4, wherein each individual user identification data element includes a password portion.

6. An authentication server as defined in claim 5, wherein the access grant mark is a cookie.

7. An authentication server as defined in claim 6, wherein the communication directed from said authentication server to the first node includes a status code indicative of whether said verification unit has granted an access right to the user.

8. An authentication server as defined in claim 5, wherein said authentication server is responsive to a communication received from the second node including a URL string, a portion of the URL string containing transaction ID data, to issue a message in the data network for prompting the user residing at the second node of the data network to enter at the second node the user identification data element.

9. An authentication server as defined in claim 8, wherein said server is responsive to the communication including the URL string to create a record of data indicative of the transaction ID data.

10. An authentication server as defined in claim 9, wherein said verification unit is responsive to an access grant inquiry message containing data corresponding to said record to direct to the first node the communication containing data permitting the first node to generate and transmit to the second node an access grant mark.

11. An authentication server as defined in claim 10, wherein said authentication server is responsive to an access grant inquiry message containing data corresponding to said record to delete said record.

12. A data network, comprising:
a plurality of nodes connected to one another by data transmission pathways;
an authentication server residing at one of said nodes;
a customer server residing at another one of said nodes, said customer server supporting a certain resource;
said customer server being responsive to a first message from a user at a certain node of said network requesting access to the certain resource to issue a response message to the certain node, said response message causing the certain node to initiate an access grant control transaction with said authentication server, said access grant control transaction characterised by requesting the user to provide a user identification data element;
said authentication server capable to direct to the customer server a communication containing data permitting the customer server to generate and transmit to the certain node an access grant mark, the access grant mark being retained by the certain node and recognizable by the customer server as indication of past occurrence of access grant by said authentication server.

13. A data network as defined in claim 12, wherein said user identification data element includes a user ID.

14. A data network as defined in claim 13, wherein said user identification data element includes a password.

15. A data network as defined in claim 14, wherein said authentication server is responsive to said identification data element provided by the user during said access grant control transaction to verify a right of the user to access said customer server.

16. A data network as defined in claim 15, wherein said authentication server includes a database holding a list of individual user identification data elements, each of said user identification data elements characterizing a user that may potentially seek access to said customer server.

17. A data network as defined in claim 16, wherein said authentication server is operable to create a transaction ID record indicative of said access grant control transaction.

18. A data network as defined in claim 17, wherein the access grant mark is a cookie.

19. A data network as defined in claim 18, wherein said customer server is responsive to said first message to create a transaction ID record and issue a redirect command toward said certain node for causing the certain node to establish said access grant control transaction with said authentication server.

20. A data network as defined in claim 19, wherein said customer server appends to said redirect command data indicative of said transaction ID record.

21. A customer server for use in a network including an authentication server, said customer server capable to support a certain resource potentially sought by a user from a certain node of the network, said customer server:
being responsive to a first message issued from the certain node requesting access to the certain resource to issue a response message to the certain node, the response message causing the certain node to initiate an access grant control transaction with said authentication server; and
being responsive at least in part to a second message issued from the authentication server containing data permitting the customer server to generate and transmit to the certain node an access grant mark, the access grant mark being retained by the
certain node and recognizable by the customer server as indication of past
occurrences of access grant by said authentication server.

22. A customer server as defined in claim 21, wherein said second message is a cookie.

23. A method for access control in a data network, said data network including:
a plurality of nodes connected to one another by data transmission pathways;
an authentication server residing at one of said nodes;
a customer server residing at another one of said nodes, said customer server supporting a certain resource, said method comprising the steps of:
a) receiving at said customer server a request for access by a user residing at a certain node of the data network to the certain resource;
b) issuing a control message toward the certain node to cause initiation of an access grant control transaction with said authentication server, said access grant control transaction characterised by requesting the user to provide a user identification data element;
c) forwarding from said authentication server to the customer server data permitting the customer server to generate and transmit to the certain node an access grant mark, the access grant mark being retained by the certain node and recognizable by the customer server as indication of past occurrence of access grant by said authentication server.

24. A method as defined in claim 23, comprising the step of generating a transaction ID record at said customer server and including data in said control message toward the certain node indicative of the transaction ID record.

25. A method as defined in claim 24, comprising said authentication server issuing a message toward the certain node during said access grant control transaction to request entry by the user of a user identification data element.

26. A method as defined in claim 25, wherein said user identification data element is selected from the group consisting of user ID and password.

27. A method as defined in claim 26, including the step of receiving the user identification data element at said authentication server and searching a database holding a list of individual user identification data elements, each of said user identification data elements characterizing a user that may potentially seek an access grant, to determine if the user at the certain node is permitted to access said customer server.

28. A method as defined in claim 27, comprising the step of transmitting from the certain node to said authentication server during said access grant control transaction the data indicative of the transaction ID record.

29. A method as defined in claim 28, comprising the step of issuing from said authentication server toward the certain node a redirect message causing the certain node to request access to the certain resource and including in the redirect message the data indicative of the transaction ID.

30. A method as defined in claim 29, comprising the step of comparing the transaction ID data received at said customer server in the response to the request to access the certain resource by the certain node with the transaction ID record at said customer server.

* * * * *